(12) United States Patent
Berdan

(10) Patent No.: US 9,606,372 B2
(45) Date of Patent: Mar. 28, 2017

(54) EYEWEAR WITH MULTI-FUNCTION INSERT CHASSIS CLIPS

(71) Applicant: Davesh, LLC., Spokane, WA (US)

(72) Inventor: Greg Berdan, Greenacres, WA (US)

(73) Assignee: DAVESH, LLC., Spokane, WA (US)

( * ) Notice: Subject to any disclaimer, the term of this patent is extended or adjusted under 35 U.S.C. 154(b) by 0 days.

(21) Appl. No.: 14/483,676

(22) Filed: Sep. 11, 2014

(65) Prior Publication Data
US 2016/0077355 A1   Mar. 17, 2016

(51) Int. Cl.
*G02C 1/06* (2006.01)

(52) U.S. Cl.
CPC ........... *G02C 1/06* (2013.01); *G02C 2200/04* (2013.01); *G02C 2200/08* (2013.01)

(58) Field of Classification Search
CPC ... G02C 1/06; G02C 1/08; G02C 1/10; G02C 13/001
USPC ............................ 351/47, 57, 92, 106, 83–89
See application file for complete search history.

(56) References Cited

U.S. PATENT DOCUMENTS

| | | | | |
|---|---|---|---|---|
| 3,838,914 A | * | 10/1974 | Fernandez | G02C 1/04 351/106 |
| 4,919,530 A | * | 4/1990 | Hyman | G02C 11/02 351/124 |
| 5,457,503 A | * | 10/1995 | Chen | A61F 9/025 351/105 |
| 5,467,148 A | * | 11/1995 | Conway | G02C 1/04 351/103 |
| 6,533,412 B1 | | 3/2003 | Wang et al. | |
| 7,524,055 B2 | | 4/2009 | Schepke et al. | |
| 7,883,205 B2 | | 2/2011 | Begg | |
| 8,668,330 B2 | * | 3/2014 | Reyes | A61F 9/025 351/106 |

FOREIGN PATENT DOCUMENTS

| | | |
|---|---|---|
| CN | 2664012 Y | 12/2004 |
| CN | 103048801 A | 4/2013 |
| CN | 202916529 U | 5/2013 |
| WO | 2006/043941 A1 | 4/2006 |

OTHER PUBLICATIONS

PCT International Search Report and Written Opinion, dated Jan. 12, 2016, issued in International Patent Application No. PCT/US15/46812, 9 pages.

* cited by examiner

*Primary Examiner* — Ricky Mack
*Assistant Examiner* — Kristina Deherrera
(74) *Attorney, Agent, or Firm* — Nixon Peabody, LLP; Khaled Shami

(57) ABSTRACT

An eyewear apparatus with interchangeable insert chassis components that may insert into a frame structure in accordance with a specific mechanical interlocking apparatus. In particular, the contour of the insert chassis may conform to the contour of a channel in the frame, and tabs or notches in the chassis insert may snap into a hole, tab, or indentation in the nose of the frame, and at either side of the frame near the temples, as described herein.

9 Claims, 5 Drawing Sheets

EYEWEAR WITH MULTI-FUNCTION INSERT CHASSIS CLIPS

BACKGROUND

Technical Field

The inventions described herein relate to eyewear apparatuses.

Description of the Related Art

Eyewear has many uses, including the blocking of sunlight, the correction of nearsightedness, farsightedness, or astigmatism, to correct presbyopia while reading, to shield the eyes from possible projectiles, wind, or contaminants, of for fashion. Often, different lenses are required for different purposes.

Several companies provide eyewear with interchangeable lens inserts. For example, U.S. Pat. No. 6,533,412 B1 describes eyeglasses with interchangeable lenses in which two lenses may be individually attached to a frame. At the temple, the lens is secured by a notch and a tang. At the nosepiece, there is a protruding pin that fits within a circular aperture in the lens. U.S. Pat. No. 7,524,055 B2 describes eyewear in which separate lenses are each individually attached at a nosepiece by tab in each lens that fits in a respective groove within the nosepiece. U.S. Pat. No. 7,883,205 B2 describes clip-on glasses with two lenses that each fit into "lens grabbers" on the clip-on frame. U.S. Pat. No. 8,668,330 describes glasses in which individual frames are secured to a groove with a latch device.

One problem with existing designs is that they are usually unsuitable for use with corrective lenses, because the lenses are designed to fit into a frame, but the lenses themselves are not otherwise surrounded by a frame. Corrective lenses come in a variety of thicknesses, thus making it difficult to use them interchangeably with a standard frame, which must accommodate a variety of different lenses of different thicknesses. In addition, the design of prior interchangeable eyewear limits their versatility in terms of look, color, and proportions, because each lens typically must have standard measurements.

It is therefore desirable to have an interchangeable eyewear system with added versatility in terms of the size, shape, purpose, and appearance of the interchangeable parts.

BRIEF SUMMARY

Described herein are embodiments of an eyewear apparatus. In one embodiment, the apparatus comprises a chassis insert and a frame. The chassis insert may comprise a chassis insert frame enclosing and securely holding a right lens and a left lens. The chassis insert frame may comprise the following: a nose bridge connecting the right and left halves of the chassis insert frame, with a tapered shape between the right and left lenses to accommodate a human nose; a top right and top left part of the chassis frame that lies above the right and left lens, respectively, the top right and top left parts joined by a top nose bridge part which constitutes the topmost portion of the nose bridge; and right and left temple portions wherein a top part of the chassis insert frame meets an outside right or left part, respectively, of the chassis insert frame at an angle, each of the right and the left outside parts comprising, respectively, a right and left chassis insert notch or protrusion.

The frame in the above embodiment may comprise the following: right and left ear pieces; a front frame, connected to the right and left ear pieces right and left hinges, respectively, comprising a right and left temple portion and a nose bridge portion; wherein the front frame comprises a groove with a size and shape to accommodate the top right, top left, and top nose bridge parts of the chassis frame; wherein the groove comprises a front portion and a rear portion of the front frame, the front portion being sized and shaped to cover a front portion of the top right, top left, and top nose bridge parts of the chassis frame, and the rear portion being sized and shaped to cover a rear portion of the top right, top left, and top nose bridge parts of the chassis frame.

In the above embodiment, the groove may comprise, within and enclosed by the grove, a right frame protrusion or notch and a left frame protrusion or notch, each at a location such that it will engage with the right and left notches or protrusions of the chassis insert frame, respectively, when the chassis insert frame is fully inserted into the groove, wherein the right and left frame protrusions or notches are protrusions if the right and left chassis insert notches or protrusions are notches, and the right and left frame protrusions or notches are notches if the right and left chassis insert notches or protrusion are protrusions.

In another embodiment, the right and left frame protrusions or notches may be notches, and the right and left chassis insert notches or protrusions may be protrusions. Alternatively, the right and left frame protrusions or notches may be protrusions, and the right and left chassis insert notches or protrusions may be notches.

In another embodiment, the chassis insert frame may further comprise a chassis insert tab or cavity situated at the top nose bridge part, facing toward an inward direction (a direction that would be toward the wearer). The nose bridge portion of the front frame may comprise a frame cavity or tab at a location such that it will engage with the chassis insert tab or cavity, when the chassis insert frame is fully inserted into the groove, wherein the chassis tab or cavity is a tab if the frame cavity or tab is a cavity, and the chassis tab or cavity is a cavity if the frame cavity or tab is a tab.

In another embodiment, the frame cavity or tab may be a cavity, and the chassis tab or cavity may be a tab. Alternatively, the frame cavity or tab may be a tab, and the chassis tab or cavity may be a cavity.

In another embodiment, the top right, top left, and top nose bridge parts may be of a uniform width when viewed from above, and the groove may be of a corresponding uniform width across its length.

In another embodiment, the lenses may have a focal length for the treatment of myopia, hyperopia, astigmatism, and/or presbyopia.

Other embodiments are disclosed herein.

BRIEF DESCRIPTION OF THE DRAWINGS

The accompanying drawings, which are incorporated into this specification, illustrate one or more exemplary embodiments of the inventions disclosed herein and, together with the detailed description, serve to explain the principles and exemplary implementations of these inventions. One of skill in the art will understand that the drawings are illustrative only, and that what is depicted therein may be adapted based on the text of the specification or the common knowledge within this field.

In the drawings, where like reference numerals refer to like reference in the specification:

FIGS. 5B and 5C represent two different shapes for the insert chassis.

DETAILED DESCRIPTION

The following detailed description is illustrative only and is not intended to be in anyway limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. In the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
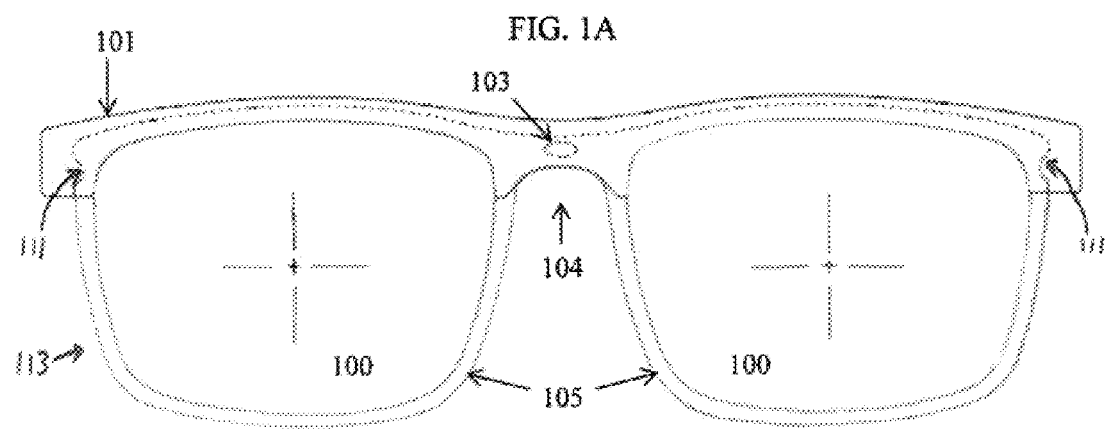
FIGS. 1A and 1B are front and side views, respectively, of example embodiments of a frame and an insert chassis in their engaged state.
Figure 1B:
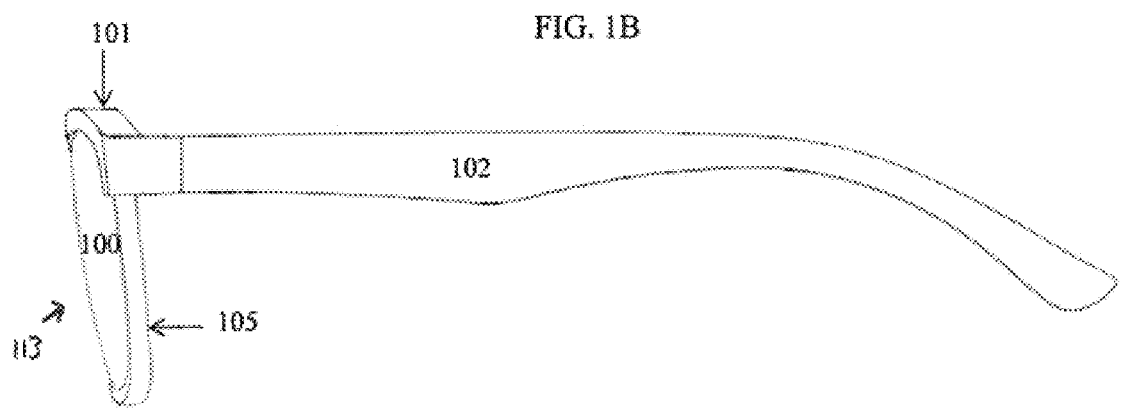

FIGS. 1A and 1B are front and side views, respectively, of an example embodiment of eyewear. It includes a frame 101 and an insert chassis 113. These are shown in their engaged state. The insert chassis 113 includes lenses 100 which are enclosed by chassis insert frame 105. While FIGS. 1A and 1B show lenses 100 entirely enclosed by chassis insert frame 105, in other embodiments, lenses 100 may be only partially enclosed by chassis insert frame 105. Also shown are earpieces 102. In FIG. 1A, the frame is shown to include right and left frame protrusions 111 to engage with corresponding notches in the insert chassis. in the nose portion 104 of the frame, the embodiment also shows a hole 103 in the frame, into which a tab of the insert chassis may engage.

Figure 2:
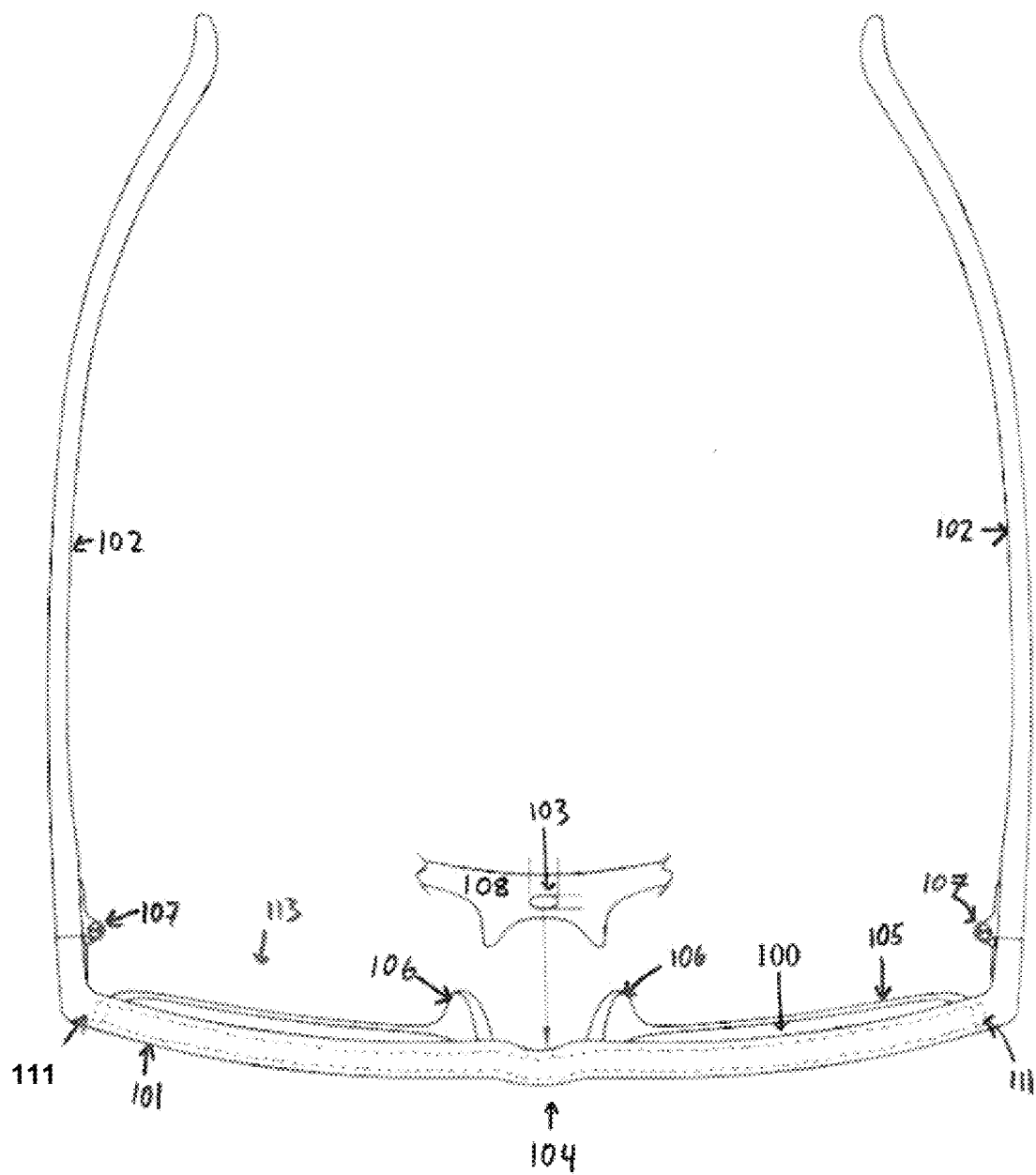
FIG. 2 is a top view, and a cut-out partial view showing a nose attachment hole.

FIG. 2 is a top view, and a cut-out partial view 108 showing a nose attachment hole 103. The partial view 108 is rotated 90° outward away from the viewer. This drawing shows the earpieces 102, and hinges 107 on the frame 101. In this embodiment, the chassis insert 113 includes flared nose rests 106, for engaging with the nose of a wearer. In other embodiments, the chassis insert may, for example, contain nose pads or other nose engagement pieces. at the nose bridge region 104 of the frame, there is shown a hole 103, into which a tab of the chassis insert frame may engage. Alternatively, a tab in the chassis insert frame may engage with a notch or indentation in the frame. In another embodiment, a tab in the frame may engage with a hole, notch, or indentation in the insert chassis frame. In other embodiments, multiple tabs or protrusions may engage with multiple holes or indentations. These tabs, protrusions, holes, or indentations may be on either the frame or the chassis insert frame, in any combination.

Figure 3:
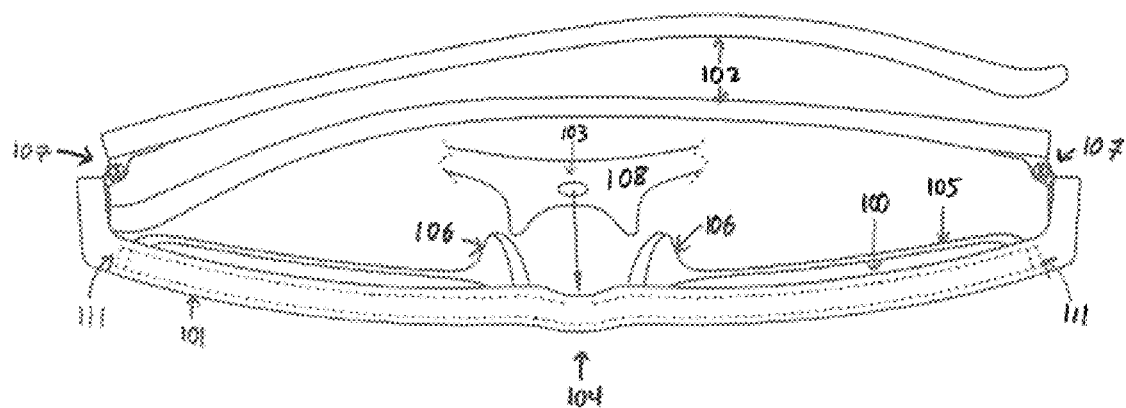
FIG. 3 is a top view, with the earpieces folded at the hinges.

FIG. 3 is a top view, similar to FIG. 2, with the earpieces folded at the hinges.

Figure 4:
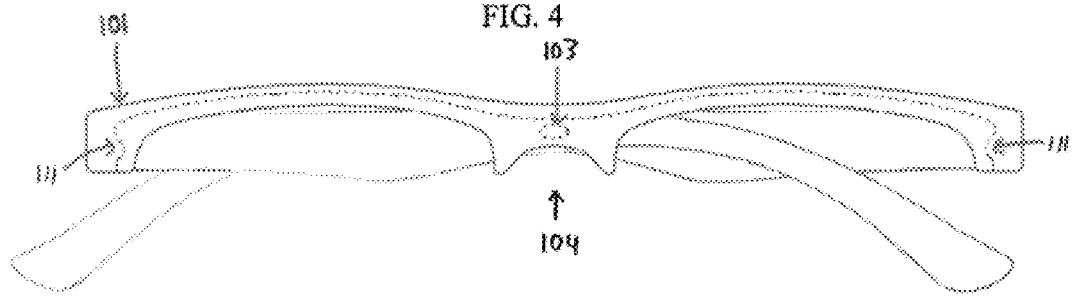
FIG. 4 is a front view of the frame, without the insert chassis.

FIG. 4 is a front view of the frame 101, without the insert chassis. It shows protrusions 111 at the right and left sides of the frame. At the nose bridge region 104, it shows a hole 103, for engagement with a tab on an insert chassis frame.

Figure 5A:
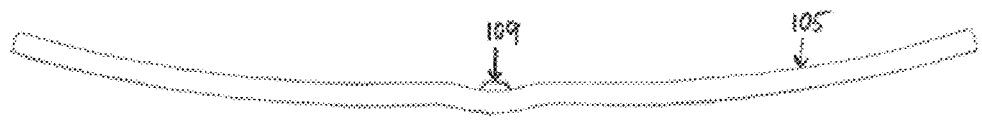
FIGS. 5A, 5B, and 5C, are top, side, and side views, respectively, of an insert chassis.
Figure 5B:
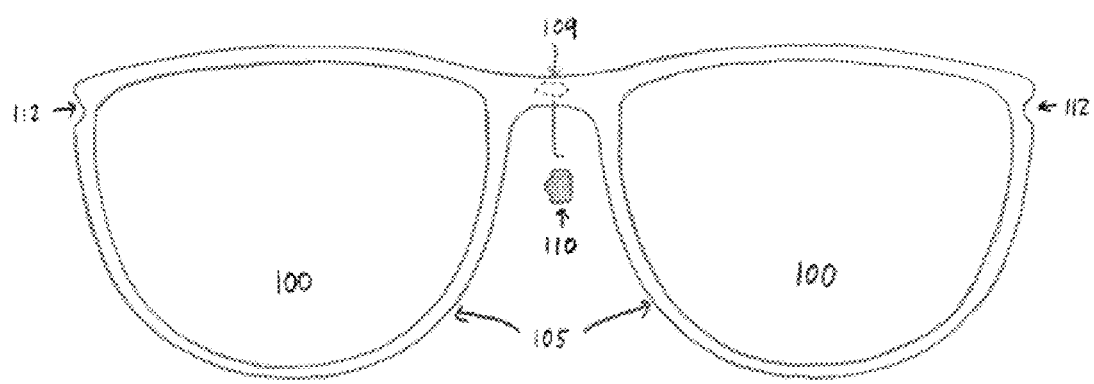
Figure 5C:
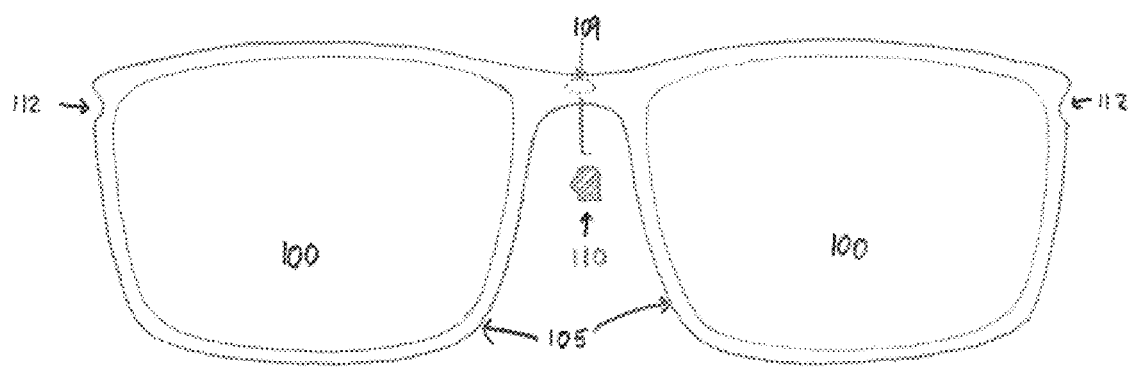

FIGS. 5A, 5B, and 5C, are top, side, and side views, respectively, of example insert chassis. In these embodiments, the chassis frames include protrusions 109 in the nose bridge region, which may engage with a hole or indentation on the frame. This example protrusion is also shown in cross-sectional view 110. As previously noted, this may alternatively be an indentation, which may engage with a protrusion on the frame piece. The protrusion (or indentation) may be on may be on the rear of insert chassis frame 105, facing toward the direction of a wearer. In another embodiment, it may face outward from the direction of a wearer. Various other means of engagement between the chassis insert and the frame piece may be used, such as latches, clamps, pins, or the like.

FIGS. 5B and 5C represent two different shapes for the insert chassis. There may be wide variation in the size, shape, and other properties of the insert chassis, depending on function, fashion, vision needs, medical needs, or other considerations. Because the chassis insert includes a chassis insert frame 105 sized to engage with the frame piece, the size of the lenses themselves need not be uniform. They may be wider or narrower as may be required for vision correction. With no necessary limitation on the size or profile of the lenses, they may be used as reading glasses, bifocals, safety glasses, sport glasses, sunglasses, personal display or virtual reality devices, active or passive 3D glasses, or various other types of eyewear. In addition, the frames 105 may be of various colors, compositions, sizes, or shapes, to suit functional and/or aesthetic purposes. Examples of suitable compositions for a chassis insert frame may include injected polymers (e.g., TR-90, acetate plastics), non-injected polymers, metal, wood, and other commonly used materials for sunglasses and ophthalmic eyewear.

Figure 6:
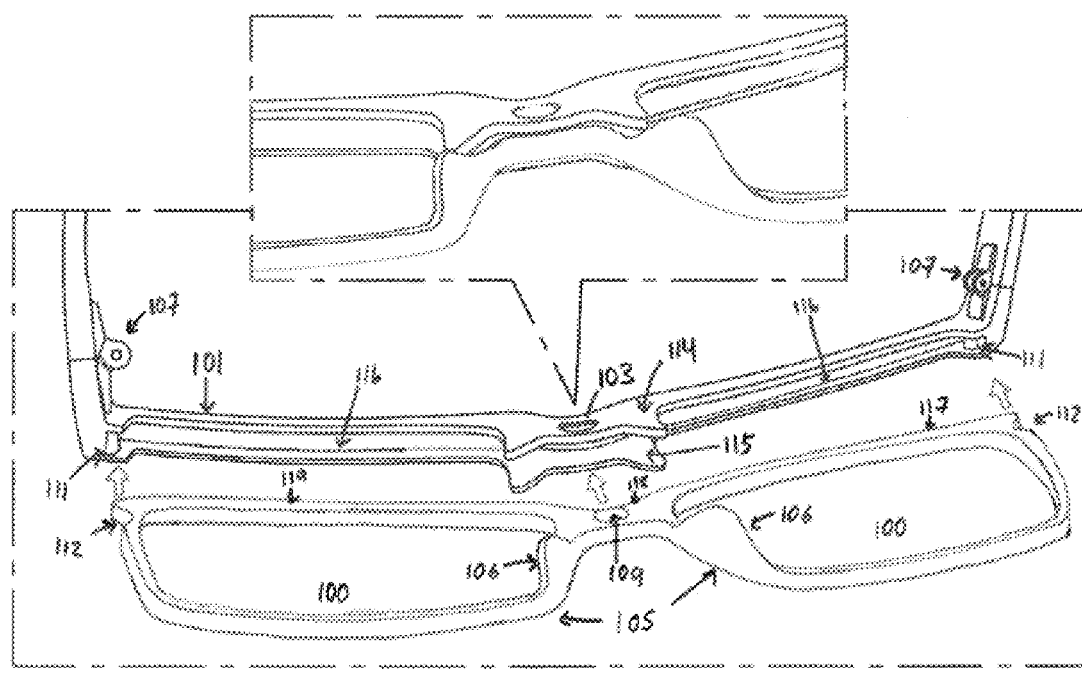
FIG. 6 is a view of the insert chassis next to the frame, showing how it may be inserted, and a detail view of the insert chassis inserted into and engaged with the frame.

FIG. 6 is a view of the insert chassis next to the frame, showing how it may be inserted, and a detail view of the insert chassis inserted into and engaged with the frame. The front frame piece 101 includes a groove 116. On either side of the groove are a rear frame portion 114 and a front frame portion 115. The front portion 115 may be sized and shaped to cover a front portion of the top right 117, top left 119, and top nose bridge 118 parts of the chassis frame 105, and the rear portion 114 may be sized and shaped to cover a rear portion of the top right 117, top left 119, and top nose bridge 118 parts of the chassis frame 105.

The above designs allow the ability to change the entire chassis inert with respect to a given frame piece. A user may, for example, have specific chassis inserts for particular purposes, and be able to interchange them with the same frame piece. In addition, the user may switch a particular chassis insert among multiple frame pieces of different styles or purposes.

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. An eyewear apparatus comprising:
   one or more insert chassis, each configured to accommodate a chassis insert frame of various shapes and sizes, wherein the chassis insert frame is configured to enclose and secure a right lens and a left lens, wherein the chassis insert frame comprises:
- a nose bridge connecting right and left halves of the chassis insert frame, with a tapered shape between the right and left lenses to accommodate a human nose;
- chassis insert frame top right and top left parts, lying above the right and left lenses, respectively, the top right and top left parts joined by a top nose bridge part which constitutes the topmost portion of the nose bridge; and
- an outside right part coupled to the chassis insert frame top right part and having a right chassis insert notch or protrusion;
- an outside left part coupled to the chassis insert frame top left part and having a left chassis insert notch or protrusion; and a frame piece comprising:
- right and left ear pieces;
- a front frame constructed of a first non-magnetic material, connected to the right and left ear pieces with right and left hinges, respectively, comprising a right and left temple portion and a nose bridge portion;
- wherein the front frame comprises a groove having an interior surface defined by the first non-magnetic material and having a size and shape to accommodate the top right, top left, and top nose bridge parts of the chassis insert frame in contact with the first non-magnetic material defining the interior surface of the groove;
- wherein the groove comprises a front portion and a rear portion of the front frame, the front portion being sized and shaped to cover a front portion of the top right, top left, and top nose bridge parts of the chassis insert frame, and the rear portion being sized and shaped to cover a rear portion of the top right, top left, and top nose bridge parts of the chassis insert frame;
- wherein the groove comprises, within and enclosed by the groove, a right frame protrusion or notch and a left frame protrusion or notch, each at a location such that it will engage with the right and left notches or protrusions of the chassis insert frame, respectively, when the top right, top left, and top nose bridge parts of the chassis insert frame are fully inserted into the groove, wherein the right and left frame protrusions or notches are protrusions if the right and left chassis insert notches or protrusions are notches, and the right and left frame protrusions or notches are notches if the right and left chassis insert notches or protrusion are protrusions; and
- wherein the chassis insert frame further comprises a chassis insert tab or cavity situated at the top nose bridge part, facing toward an inward direction (a direction that would be toward a wearer), and wherein the nose bridge portion of the front frame comprises a frame cavity or tab at a location such that will engage with the chassis insert tab or cavity, when the top right, top left, and top nose bridge parts of the chassis insert frame are fully inserted into the groove, wherein the chassis insert tab or cavity is a tab if the frame cavity or tab is a cavity, and the chassis insert tab or cavity is a cavity if the frame cavity or tab is a tab.

2. The apparatus of claim 1, wherein the right and left frame protrusions or notches are notches, and the right and left chassis insert notches or protrusions are protrusions.

3. The apparatus of claim 1, wherein the right and left frame protrusions or notches are protrusions, and the right and left chassis insert notches or protrusions are notches.

4. The apparatus of claim 1, wherein the frame cavity or tab is a cavity, and the chassis insert tab or cavity is a tab.

5. The apparatus of claim 1, wherein the frame cavity or tab is a tab, and the chassis insert tab or cavity is a cavity.

6. The apparatus of claim 1, wherein the top right, top left, and top nose bridge parts are of a uniform width when viewed from above, and wherein the groove is of a corresponding uniform width across its length.

7. The apparatus of claim 1, wherein the lenses have a focal length for the treatment of myopia, hyperopia, astigmatism, and/or presbyopia.

8. The apparatus of claim 1, wherein said one or more insert chassis comprise a first insert chassis and a second insert chassis, wherein the second insert chassis is interchangeable with the first insert chassis, and wherein the second insert chassis differs substantially from the first insert chassis in at least one property selected from the group consisting of focal length of the lenses, color of the chassis insert frame, shape, composition of the lenses, and composition of the chassis insert frame.

9. A method of using the apparatus of claim 1, comprising inserting the insert chassis into the groove of the frame piece, such that the right frame protrusion or notch and a left frame protrusion or notch is engaged with the right and left notches or protrusions of the chassis insert frame, respectively.

* * * * *